United States Patent
Vakil et al.

(10) Patent No.: US 12,513,434 B2
(45) Date of Patent: Dec. 30, 2025

(54) READ-OUT INTEGRATED CIRCUIT (ROIC) INTERFACE SYSTEM FOR DIGITIZATION AND CONTROL (RIS-DC)

(71) Applicant: Government of the United States, as represented by the Secretary of the Air Force, Wright-Patterson AFB, OH (US)

(72) Inventors: Mohammad Vakil, Beavercreek, OH (US); Marc Hoffman, Beavercreek, OH (US); DeJuan Daniels, Dayton, OH (US); David Walker, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 63 days.

(21) Appl. No.: 18/414,547

(22) Filed: Jan. 17, 2024

(65) Prior Publication Data
US 2025/0234112 A1 Jul. 17, 2025

(51) Int. Cl.
*H04N 25/78* (2023.01)
*H04N 25/709* (2023.01)
*H04N 25/79* (2023.01)

(52) U.S. Cl.
CPC .......... *H04N 25/78* (2023.01); *H04N 25/709* (2023.01); *H04N 25/79* (2023.01)

(58) Field of Classification Search
CPC ....... H04N 25/78; H04N 25/709; H04N 25/79
See application file for complete search history.

(56) References Cited

U.S. PATENT DOCUMENTS

| | | | |
|---|---|---|---|
| 9,681,028 B2 * | 6/2017 | Jannard | H04N 23/90 |
| 2002/0018126 A1 | 2/2002 | Ikeda | |
| 2003/0038842 A1 | 2/2003 | Peck | |
| 2006/0184335 A1 | 8/2006 | Odom | |
| 2008/0218601 A1 | 9/2008 | Suemoto | |
| 2014/0049616 A1 | 2/2014 | Stettner | |
| 2014/0270687 A1 * | 9/2014 | Jannard | H04N 9/806 386/224 |
| 2016/0282921 A1 | 9/2016 | Kodavalla | |
| 2017/0019186 A1 | 1/2017 | Wiley | |
| 2019/0102881 A1 | 4/2019 | Fujimoto | |
| 2023/0370748 A1 * | 11/2023 | Vaik | H04N 25/76 |

OTHER PUBLICATIONS

Office Action dated Mar. 21, 2025 in U.S. Appl. No. 18/316,753.
U.S. Appl. No. 18/316,753, filed May 12, 2023, Vakil, et al.
Office Action dated Nov. 17, 2025 in U.S. Appl. No. 18/316,753.

* cited by examiner

*Primary Examiner* — Nicholas G Giles
(74) *Attorney, Agent, or Firm* — AFMCLO/JAZ; Jeffrey V. Bamber (57) ABSTRACT

The present invention generally relates to pulse capture electronics (PCE) of an imaging system that provides the ability to interface with, control, and test Read-Out Integrated Circuits (ROIC), and communicate the image data to a computing device for rendering and/or computational processing. The RIS-DC includes a single board signal processing architecture that is combined with a processor board to enable various operational requirements and varying ROICs to be configured to produce an operational imaging system.

13 Claims, 4 Drawing Sheets

READ-OUT INTEGRATED CIRCUIT (ROIC) INTERFACE SYSTEM FOR DIGITIZATION AND CONTROL (RIS-DC)

RIGHTS OF THE GOVERNMENT

The invention described herein may be manufactured and used by or for the Government of the United States for all governmental purposes without the payment of any royalty.

FIELD OF THE INVENTION

The present invention relates generally to Pulse Capture Electronics (PCE) of an imaging system that provides the ability to interface with, control, and test Read-Out Integrated Circuits (ROIC), and communicate the image data to a computing device for rendering and/or computational processing.

BACKGROUND OF THE INVENTION

Figure 1:
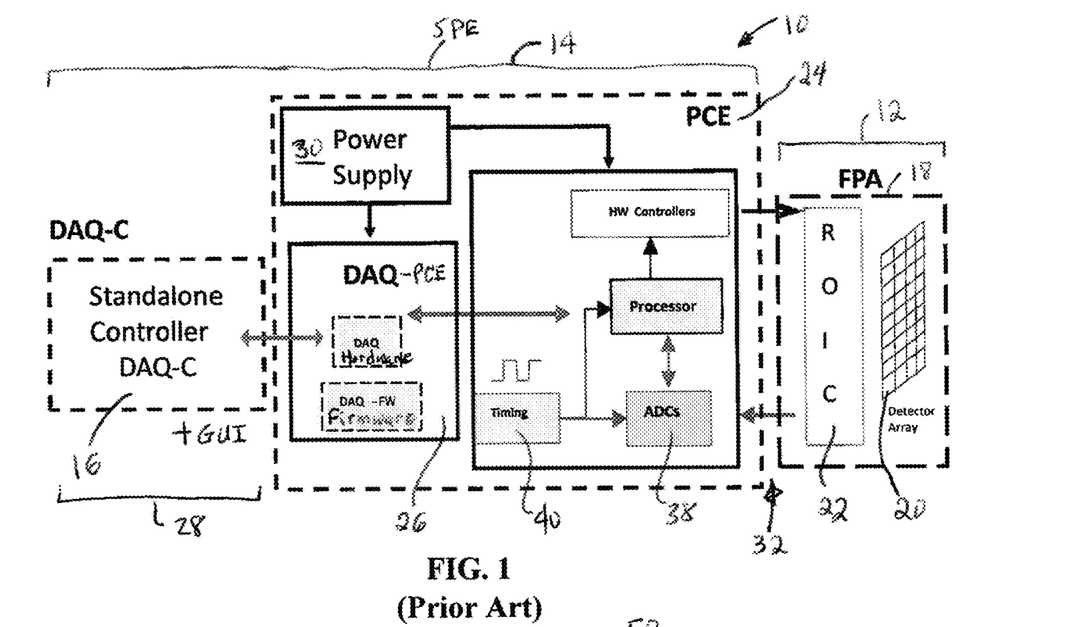
FIG. 1 is a high-level subsystem block diagram for passive EO/IR imagers.

FIG. 1 shows that passive Electro-Optical/Infra-Red (EO/IR) imagers 10, in general, consist of three subsystems. These include: 1) an optical frontend 12; 2) a Signal Processing Electronics (SPE) subsystem 14; and 3) a Data Acquisition & Control (DAQ-C) subsystem 16. As shown in FIG. 1, the Data Acquisition & Control (DAQ-C) subsystem may be part of the Signal Processing Electronics (SPE) subsystem 14.

The optical frontend 12 consists of a single or multiple lens (conventional and not shown in FIG. 1) that focuses the incoming light onto a Focal Plane Array (FPA) 18 which is a detector array 20 bonded to a Read-Out Integrated Circuit (ROIC) 22. The detector array 20 senses optical radiation and transduces it into a voltage or current signal. The ROIC 22 then reads the transduced signal levels generated by optical radiation and enables the performance of the optical frontend 12. Therefore, the ability to interface with, control, and test ROICs for system design is essential. The output of the ROIC 22 is the detector intensities of the image data. This data can be digital or analog depending upon the ROIC used.

The second subsystem constitutes Signal Processing Electronics (SPE) 14 which includes the Pulse Capture Electronics (PCE) 24. The PCE 24 digitizes, formats, and processes the data from the ROIC 22. The PCE 24 uses a DAQ interface or module (DAQ-PCE) 26 to send the data to the DAQ-C 16. The DAQ-PCE 26 is a subsystem of the PCE that comprises DAQ hardware and DAQ firmware to control the hardware. The PCE 24 is generally also responsible for providing power, timing, and control signals to the ROIC 22.

The third subsystem is the Data Acquisition & Control (DAQ-C) subsystem 16 which is hosted by a backend processing subsystem 28. The DAQ-C system 16 receives data and sends control parameters to the PCE 24. The backend processing subsystem 28 is usually a PC or single board computer used for displaying the image on a graphical user interface (GUI) and/or performing signal processing for further analysis.

A turnkey imaging system will include the optical frontend 12, Pulse Capture Electronics (PCE) 24 with required power supplies 30, control signals, and some interface hardware/software combination to communicate with the Data Acquisition hardware/software and to interface with a PC. The frontend interface is generally targeted for a particular optical frontend, i.e., to interface with a certain ROIC model, from a given vendor.

In most cases, the PCE 24 is designed on multiple cards as integrated hardware and not as a single card that can be removed and plugged into another optical frontend 12. The majority of ROICs 22 used are commercial off-the-shelf (COTS) products, and most of the PCEs 24 and rendering hardware or software (part of the DAQ-C) is also COTS which is not specialized towards a certain detector technology. In order to be a turnkey system, the PCE 24 is designed to accommodate most general hardware utilizing multiple cards and cable options and is not targeted for a small footprint, low power, or customized for a particular ROIC 22.

The currently available PCEs 24 may not even work for all the optical frontends 12 by the same manufacturer and is extremely unlikely to work for optical frontends made by a different manufacturer. As discussed above, the optical frontend 12 consists of a Focal Plane Array (FPA) 18 which is a combination of a two-dimensional detector array 20 and a ROIC 22. The interface 32 to the optical frontend 12 is defined by the ROIC 22 that is used. The design of the ROIC 22 is dependent on the size of the detector array 20 which translates into: the data rates out of the ROIC 22, the various voltage levels that are required by the ROIC 22 and the detector array 20, associated control signals placed by the designer, and speed or timing (internal clock) of the ROIC, to list a few factors.

There are turnkey PCE systems 24 which are sold as boxes with card slots for which one must purchase different cards for a specific FPA 18, making these boxes bulky and not suited for handheld applications where a single or dual board architecture is preferred. The size of these boxes also makes them impractical for platforms where there is limited space such as on an airborne and space borne platforms such as unmanned aircraft systems (UAS).

These boxes are also not open architecture and use proprietary software to capture the imaging data. The data acquisition hardware (DAQ-HW) and software (DAQ-SW) or firmware (DAQ-FW) are usually a combination of both COTS hardware and a vendor-developed software utility. The DAQ-C system 16 is limited to a certain data rate and format; the software utility, in general, is geared towards a set number of data formats. While the software may be upgradable either by paying a Non-Recurring Engineering (NRE) cost or a general maintenance fee, it usually cannot be modified for domain-specific signal processing. The inability to use standard software such as PYTHON™ or MATLAB® and popular high-level programming language such as C, C++, hinders advanced testing of the optical frontends 12 and restricts the user to a standard proprietary interface for designing and configuring tests.

The first step in testing or operating an optical frontend 12 is powering it up and providing control signals to configure the ROIC 22 before any data can be collected. Depending on the ROIC 22, the power supplies 30 are required to boot up in a specific sequence or else they may not function as designed. Hence, the PCE 24 should provide the capability of sequencing power supplies for both boot-up and shut down process for a ROIC 22. Almost all the ROICs will provide the ability to be configured. This is done by providing the data for the registers in the ROIC that set the configuration parameters. Different ROICs from different vendors as well as different ROICs from same vendors will have varying number of control signals and data registers.

Prior to any signal processing, the intensities transduced into an electric signal must be digitized for analog ROICs 22. This is accomplished by Analog to Digital Converters (ADCs) 38. An ADC will represent the digitized signal as a combination of number of bits. The number of bits will depend on the ADC employed for digitization and will vary with the system requirements. Ideally, the ADC 38 aspect of system design should be agile enough to be modified as needed. For fast processing and coarse identification of structures in an image, a low number of bits for ADC will suffice. The higher the number of bits, the more resolution will be provided for the amplitude of the intensity captured by the detector array 20. The higher the number of bits, the more data must be processed per pixel which can increase the signal processing hardware requirements.

For both digitization and signal processing hardware, arguably the most critical factor is the clock management system 40. The clock frequency for ADCs 38 enables the ability to digitize in a specific window of time. Depending on the ROIC 22 and the signal processing hardware, the clock management system 40 can provide different phase delays of the clock to align processing of the data at the same instant, or it can provide slower clocks derived from a master clock to ensure phase alignment. These two instances stated above are the most common scenarios, however, as the system design gets complex there are other instances in which the clock management system plays a critical part.

Signal processing hardware requirements whether targeted for military missions or commercial applications also constitute a much-overlooked system limitation. Depending on the optical frontend 12 (the size of image) and the processing required for the number of pixels in an image, this can require a high-density processor to perform real-time signal processing for formatting or threat detection. Conversely, for the operator in the loop type scenarios low Size, Weight, and Power (SWaP) scenarios, a scaled-down processor may be required just for image rendering in an expeditious manner.

Signal processing hardware requirements not only translate to density and scale of the processing hardware, but will also affect the technology used to implement synthesized logic and software instructions. There are multiple vendors for Field Programmable Gate Arrays (FPGAs), Graphical Processors, and heterogenous processors (FPGA plus processors in a chip) to name a few of these devices. Making this issue more complex are the tools provided by the vendor, amount of memory devices, multipliers for signal processing and mathematical operations, etc. native to each device.

There remains a need for improvements to be made. Specifically, a need exists for pulse capture electronics (PCE) of an imaging system that provides the ability to interface with, control, and test Read-Out Integrated Circuits (ROIC), and communicate the image data to a computing device for rendering and/or computational processing.

There is a need to provide such a system that comprises a single board architecture that may comprise part of a dual board configuration that can be plugged into different optical frontends. In particular, there is a need to provide such a system that is able to interface with different ROIC models and optical frontends, including those from different manufacturers. There is also a need for such a system that has the ability to use standard software, and that is small enough to be suitable for airborne and spaceborne applications.

SUMMARY OF THE INVENTION

The present invention relates generally to pulse capture electronics (PCE) of an imaging system that provides the ability to interface with, control, and test Read-Out Integrated Circuits (ROIC), and communicate the image data to a computing device for rendering and/or computational processing.

While the invention will be described in connection with certain embodiments, it will be understood that the invention is not limited to these embodiments. To the contrary, this invention includes all alternatives, modifications, and equivalents as may be included within the spirit and scope of the present invention.

The present invention can be provided in the form of a single board that comprises reconfigurable signal processing architecture. This single board may be combined with a processor board to form a dual board Read-out Integrated Circuit (ROIC) Interface System for Digitization and Control (RIS-DC). In some cases, the single board may be configured for processing analog input. In other cases, the single board may be configured for processing digital input. In an alternative embodiment, the ROIC data receive interface 60 can be configured to handle either or both analog input or digital input.

In one embodiment, a single board comprising reconfigurable signal processing architecture is provided. The single board comprises a Read-out Integrated Circuit (ROIC) Interface System for Digitization and Control (RIS-DC) which has a processor interface and is configured to be combined with a processor board that contains a processor in order to form a dual board Pulse Capture Electronics (PCE) subsystem for use with an optical front end of an imaging sensor. The optical frontend includes a detector array and a Read-Out Integrated Circuit (ROIC). When the single board is configured for processing analog input, the single board comprises:

a) an analog input subsystem comprising multiple input channels (that may be configured to employ either single or multiple channels) for incoming analog signals from an optical frontend of an imaging sensor, wherein the analog input subsystem comprises an amplifier that is configured to amplify and format incoming analog signals;

b) ROIC data digitization stage comprising at least one analog to digital convertor (ADC), which ADC is a digital component that is in operative communication with the amplifier for digitization of signals amplified and formatted by the analog input subsystem, the output of ROIC data digitization stage provides digital signal output for processing and rendering of images;

c) a power subsystem that generates multiple voltage levels (which may be from a single source supply) for both RIS-DC usage and for ROIC operation that is configured and joined in a manner to transmit power to several components including the amplifier, the ADC, a processor on a separate processor board, and multiple ROIC and detector arrays of an optical frontend;

d) a timing control subsystem comprising a clock generation layer that can produce and distribute a master clock (MClk) that is in operative communication with one or more digital components on the RIS-DC and a processor board via the processor interface; and e) a processing system interface subsystem that is configured for interfacing with a processor board and for transmitting and receiving data from a processor board for timing and control of subsystems on the RIS-DC and at least one of an optical frontend and a ROIC.

In another embodiment, a single board comprising reconfigurable signal processing architecture is configured for processing digital input. In this case, the single board comprises:

a) a transceiver stage comprising multiple input channels that are configured to employ either single or multiple channels for bidirectional signals from an optical frontend of an imaging sensor and a processor;

b) a power subsystem that generates multiple voltage levels (which may be from a single source supply) for both RIS-DC usage and for ROIC operation that is connected to transmit power to several components including a processor on a separate processor board, and multiple ROIC and detector arrays of an optical frontend;

c) a timing control subsystem comprising a clock generation layer that can produce and distribute a master clock (MClk) that is in operative communication with one or more digital components on the RIS-DC and the processor board via a processor interface; and d) a processing system interface subsystem that is configured for interfacing with a processor board and transmitting and receiving data from a processor board for timing and control of subsystems on a RIS-DC and at least one of an optical frontend and an ROIC.

In other embodiments, a dual board configuration Pulse Capture Electronics (PCE) subsystem is provided for use with an optical front end of an imaging sensor. The PCE subsystem comprises:

one of the single board comprising reconfigurable signal processing architectures comprising a Read-out Integrated Circuit (ROIC) Interface System for Digitization and Control (RIS-DC) described above; and a processor board comprising a processor, output signal drivers, and a processor board interface, wherein the processor board is operatively connected to the single board at the processor board interface.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to pulse capture electronics (PCE) of an imaging system that provides the ability to interface with, control, and test Read-Out Integrated Circuits (ROIC), and communicate the image data to a computing device for rendering and/or computational processing.

The present invention includes improvements to the invention described in pending U.S. patent application Ser. No. 18/316,753, filed May 12, 2023, in the name of Vakil, et al., which is incorporated by reference herein. The Background of the Invention section of the present disclosure is also incorporated by reference herein.

The present invention improves the invention described in the prior patent application in several respects, including but not limited to: 1) improving the signal quality and strength from the ROIC by amplifying and filtering the signals prior to digitization; 2) providing switches for the power subsystem that are configured to be externally controlled by preprogramming them in a processor and/or updating them by the user through a graphical user interface (GUI) to pass the control data to the power subsystem; 3) providing the capability to interface with various COTS processors from different industry vendors; and 4) providing a clock generation and management layer that can produce and distribute a master clock (MClk) for the digital components on the RIS-DC and the COTS processor board.

The present invention is described with relation to certain aspects of FIG. 1 and with particular attention to FIGS. 2A to 4. The present invention provides a Read-Out Integrated Circuit (ROIC) Interface System for Digitization and Control (RIS-DC) 50 that is configurable to control each of a plurality of different types of ROICs 22 (an example of which is shown in FIG. 1). As shown in FIG. 1, each type of ROIC 22 is configured to operate as an optical frontend 12 to a respective optical detector array 20.

Figure 2A:
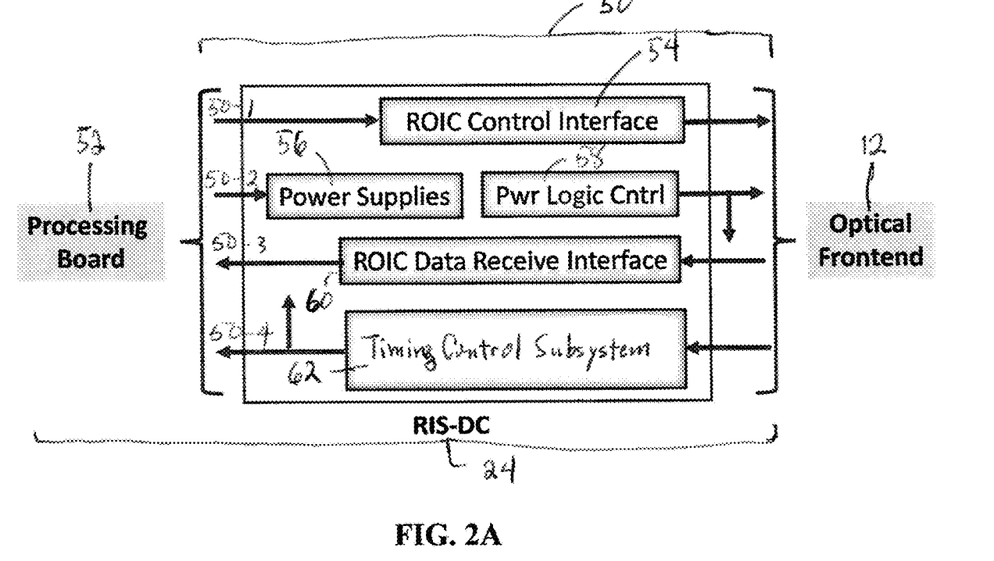
FIG. 2A is a block diagram of a ROIC Interface System for Digitization and Control (RIS-DC) configuration in the PCE with interfaces to the processing board and the optical frontend.

FIG. 2A shows one non-limiting embodiment of a Read-Out Integrated Circuit (ROIC) Interface System for Digitization and Control (RIS-DC) 50 configuration. The RIS-DC 50 is a single board reconfigurable signal processing architecture that comprises part of a dual board configuration that comprises the pulse capture electronics (PCE) 24. In other words, the pulse capture electronics (PCE) 24 comprises: a) the RIS-DC 50 which is a single board comprising reconfigurable signal processing architecture (the "single board"); and b) a processor board (or "processing board") 52. The RIS-DC 50 interfaces with the processing board 52 and an optical frontend 12. The dual board configuration provides the capability to change the processing unit and peripherals as required by the mission, or the needs of other situations.

FIG. 2A shows that the RIS-DC 50 comprises: a ROIC control interface 54, a power subsystem (shown as power supplies) 56, a power logic controller (which includes output signal drivers) 58, a ROIC data receive interface 60, and a timing control subsystem 62. The horizontal arrows are dedicated input and output signals. The vertical arrows show the signals that are used within the RIS-DC 50 as well as for external interfaces. The vertical arrows are, thus, signals that may contribute to those inputs/outputs (e.g., clocking signals, power, etc.). The RIS-DC 50 can be configured for processing analog input, digital input, or both.

The ROIC control interface 54 is a system interface subsystem that can transmit and receive data to and from an external card (the processing board 52) for timing and control of subsystems on the RIS-DC 50 and at least one of an optical frontend 12 and a ROIC 22. As in the case of the prior art device shown in FIG. 1, the optical front end 12 comprises a focal plane array (FPA) 18 comprising one or more lenses, a detector array 20, and a ROIC 22.

The power subsystem (or power supplies) 56 generates multiple voltage levels for both the RIS-DC 50 usage and for ROIC 22 operation. The power supply may generate multiple voltage levels from a single source which eliminates the need for multiple power sources. However, in other less preferred embodiments, multiple power sources may be used. The power subsystem 56 is connected to transmit power to several components including: an amplifier (if present), an ADC (if present), the processor and the output signal drivers on the processor board 52, and for multiple ROIC 22 and detector array 20 requirements for powering the optical frontend 12. The power subsystem 56 is configured to generate power signals for a target type of ROIC 22, where each power signal has a selected power level. Generally speaking, the power subsystem 56 provides various automated reconfigurable power levels that can be sequenced for boot up or shut down requirements for a given optical frontend 12. Not all voltage levels may be required for the operation of an optical frontend 12, in which case that voltage can be turned off. In some cases, the power subsystem 56 is configured so that power sources required for the ROICs are configurable so that they can be re-sequenced for powering up and powering down ROICs for a plurality of optical frontends 12 that contain ROICs and detector arrays with differing properties.

The power logic controller 58 provides the ability to turn on or off the various voltage levels going to the ROIC 22 and detector array 20. It allows this switching of voltage levels in any sequence that is required for the operation of the ROIC. This also enables a power boot up sequence and a power down sequence. The power controller 58 can take its commands from the user through the processor board 52, or it can be preprogrammed in the processor on the processor board 52. The power logic controller 58 may be considered to be part of the power subsystem 56.

The ROIC data receive interface 60 is configured to provide a plurality of available physical layer channels for coupling to a corresponding ROIC physical layer output channels (conventional and not shown) for receiving from a target ROIC optical intensity level representative electrical signals. Generally speaking, the ROIC data receive interface 60 comprises multiple channels (physical layer) where the connection to a ROIC 22 may use single, multiple but not all (i.e., some), or all channels to read, and digitize if required, the intensity levels coming out of a FPA for an analog or digital ROIC. The ROIC data receive interface 60 can be provided in the form of an analog data receive interface, a digital data receive interface, or both an analog and a digital data receive interface.

In one embodiment, the RIS-DC 50 comprises a single board reconfigurable signal processing architecture that is configured for processing analog input. In this case, the single board reconfigurable signal processing architecture comprises: a ROIC data receive interface 60 comprising a) an analog input subsystem 60A and b) a digital input subsystem shown in FIG. 4; and the following components which are shown in FIG. 2A: c) a power subsystem 56; d) a timing control subsystem 62; and e) a processing system interface subsystem 50-1 to 50-4.

Figure 4:
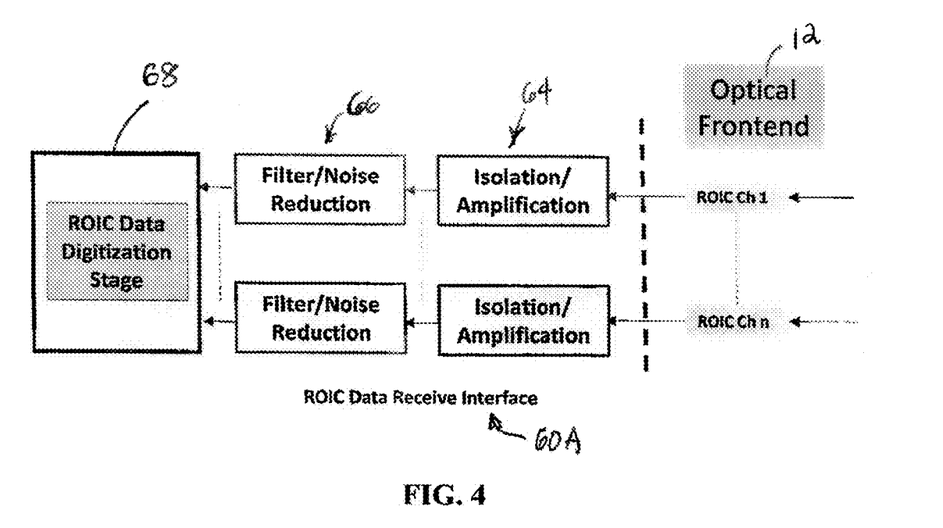
FIG. 4 is a block diagram of a ROIC data receive interface with a digitization stage.

FIG. 4 shows the details of one embodiment of an analog ROIC data receive interface 60A. The analog ROIC data receive interface 60A comprises an analog input subsystem and a ROIC data digitization stage 68. The analog input subsystem comprises multiple input channels from ROIC Channel 1 to ROIC Channel n that are configured to employ either single or multiple channels for incoming analog signals from an optical frontend 12 of an imaging sensor. As shown in FIG. 4, the analog ROIC data receive interface 60A may comprise at least one (or a plurality of) amplifiers 64 to isolate and/or amplify and format the intensity signals from each of the ROIC channels. Each channel of the analog input subsystem may, therefore, comprise multiple isolation and amplification stages to format a signal for digitization as either a single ended input or a differential input. The analog data receive interface 60A may also comprise at least one (or a plurality of) noise filters 66 to filter and/or reduce the noise from the intensity signals from each of the ROIC channels. As shown in FIG. 4, the amplifiers 64 and filters 66 may be arranged in parallel.

ROIC Data Digitization Stage 68 of an analog ROIC data receive interface 60A comprises at least one analog to digital convertor (ADC). The input stage of an ADC receives the output of the amplifier(s) 64 and filter stage 66 for digitization of signals amplified and formatted by the analog input subsystem. Each channel of the digital input subsystem may be configured to digitize the output of the analog input subsystem with varying resolution as required by an optical frontend or system requirements. Varying resolution means varying number of bits for digitization provided by the ADC. Thus, the RIS-DC can use different ADCs to enhance or modify the design. The ROIC data digitization stage provides digital output.

Figure 5:
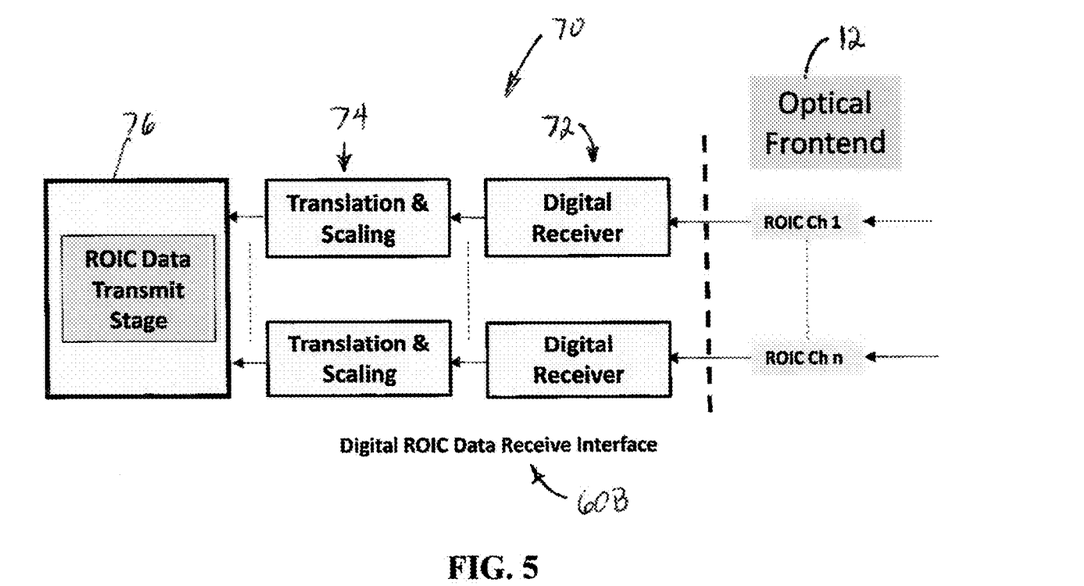
FIG. 5 is a block diagram of a digital ROIC intensity receive and transmit subsystem.

FIG. 5 shows that in an alternative embodiment, the RIS-DC 50 can be configured for digital input. FIG. 5 shows one embodiment of a digital data receive interface 60B. FIG. 5 shows that in this case, the analog input subsystem and the ROIC data digitization stage 68 are replaced by a transceiver stage 70. The transceiver stage 70 comprises multiple input channels that are configured to employ either single or multiple channels for bidirectional signals from an optical frontend 12 of an imaging sensor and a processor. As shown in FIG. 5, the transceiver stage 70 may comprise at least one (or a plurality of) digital receivers 72; at least one (or a plurality of) translation and scaling devices 74 that perform translation and scaling; and a ROIC Data Transmit Stage 76. As shown in FIG. 5, the digital receivers 72 and the translation and scaling devices 74 may be arranged in parallel. In this alternative embodiment configured for digital input, the rest of the components of the RIS-DC 50 are the same as in the analog input embodiment.

Figure 6:
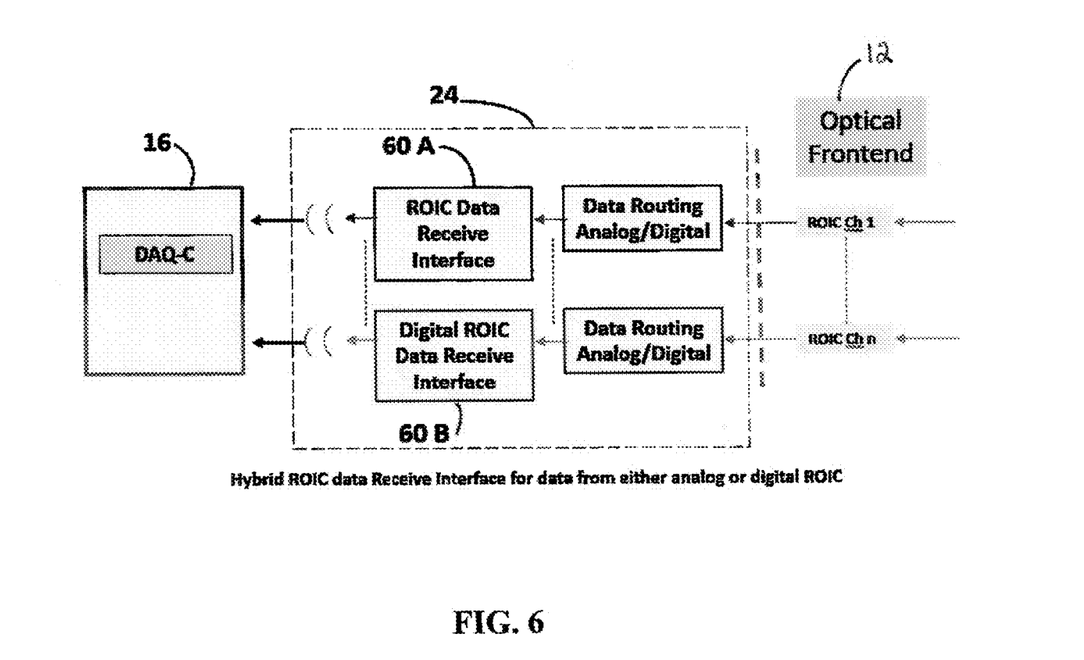
FIG. 6 is a block diagram of a hybrid ROIC data receive interface for receiving data from an analog and/or digital ROIC.

In another alternative embodiment, the ROIC data receive interface 60 can be configured to handle either or both analog input or digital input. As shown in FIG. 6, this PCE 24 embodiment comprises both stages 60A and 60B for receiving data from analog and/or digital ROICs. The data routing stage is both mechanical and logic driven. Separate mechanical connectors will be used for analog and digital data due to different numbers of signals as well as formats required. A logic signal will be generated from the microprocessor and cued by the DAQ-C 16 as it provides the GUI for the user. The data will then be processed by the PCE 24 and sent back to the DAQ-C 16.

The timing control subsystem 62 comprises a clock generation layer that can produce and distribute a master clock (MClk). The RIS-DC 50 may also have a system clock. The master clock can be the same as the system clock, however, the Master Clock in some embodiments might run at higher frequency to produce a system clock for each system configuration which may differ due to different processor clock frequencies. The timing control subsystem 62 is in operative communication with one or more digital components on the RIS-DC 50 and the processor board 52 via the processor interface. The timing control subsystem 62 will generate the master clock, and has a clock management hardware to distribute the clock both within the RIS-DC 50 and to provide a clock for the processor board 52. The timing control subsystem 62 is capable of generating master clock (MClk) of varying frequencies, which may then be distributed to some or all of the digital components in the RIS-DC 50. The digital components are any component that requires a clock to move the signal or which can be turned on or off. The digital components on the RIS-DC 50 are the power switches, the ADC (if present), the processor/s, memory devices, ethernet or digital communication ports, digital buffers, and the digital enable/disable signals. The clock management system 62 is configured to generate for the target ROIC type clock signals having characteristics selected to enable communication between the ROIC data receive interface 60 and the target ROIC 22. Generally speaking, the timing control subsystem 62 comprises multiple clock generators (physical layer) that can be used to generate single or multiple clocks that maybe required for the timing and control of a desired system configuration.

The timing control subsystem 62 may comprise multiple timing sources that can be configured to generate varying clock frequencies for a system clock or a master clock (MClk) for different mission requirements (or the intended use of the imaging system). The clock generation layer may be configured to provide at least one timing signal that can be distributed externally to a processor card or processor board to provide timing and data synchronization to generate multiple sub-harmonic signals that are phase aligned with the MClk. In some cases, some components on the RIS-DC 50 require different clock frequencies, and the clock generation layer is configured to generate derived local clocks from the MClk for the components on the RIS-DC that require different clock frequencies, while maintaining the clock phase aligned with the MClk.

The RIS-DC 50 further comprises a processing system interface subsystem that provides the capability to interface with the processing system. The processing system interface subsystem is designated by reference numbers 50-1, 50-2, 50-3, and 50-4 in FIG. 2A. The processing system interface subsystem is configured for interfacing with a processor board 52 and transmitting and receiving data from a processor board 52 for timing and control of subsystems on the RIS-DC 50 and at least one of an optical frontend 12 and an ROIC 22. The processing system interface subsystem regenerates signals required for ROIC control, power control logic, and clocks for both RIS-DC 50 and ROIC 22. This subsystem, in addition to the master clock (MClk), also provides digitized data from the ROICs 22 to the processing subsystem. The processing system interface subsystem is configured to interface the digitized output of the analog input subsystem with the processor on the processor board, which may be in the form of a heterogenous processor or a Field Programmable Gate Array (FPGA). The processing system interface subsystem may be configured to interface with processors from different vendors.

Figure 2B:
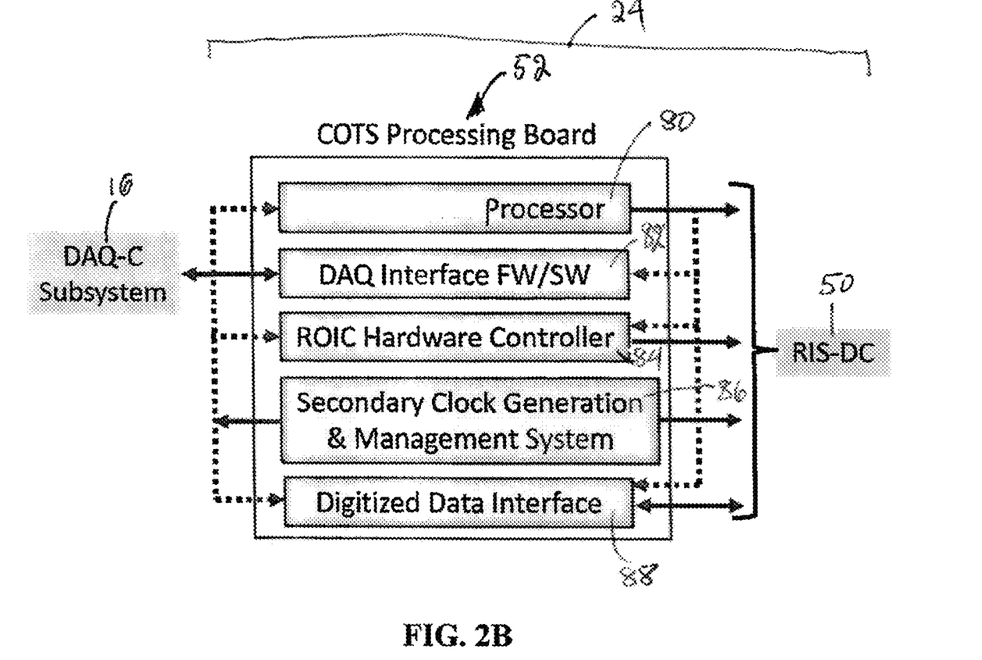
FIG. 2B is a block diagram of a processor board configuration in the PCE with interfaces to RIS-DC and DAQ-C subsystem.

The processing system is a single board computational device with a processor on it with interfaces to connect to a PC as well as interfaces to receive and transmit data to any external device. FIG. 2B shows one embodiment of a processing board ("processor board" or "processor card") 52 configuration in the PCE 24 with interfaces to the RIS-DC 50 and the DAQ-C subsystem 16. The processor board 52 may comprise a commercial off-the-shelf (COTS) processor board, or it may comprise a customized processor board. COTS processor boards are provided as programmable (or reconfigurable) which allows firmware and software to be written thereon.

The processor board 52 configuration shown in FIG. 2B comprises: a processor 80, a Data Acquisition (DAQ) interface with Firmware/Software (FW/SW) 82, a ROIC hardware controller 84, a secondary clock generation and management system 86, and a digitized data interface 88. The processor board 52 may further comprise: output signal drivers (conventional and not shown), a processor interface, and a processing system interface. The processor interface (conventional and not shown) is a physical pin on the processor chip providing a signal access to the processor 80. The processing system interface (conventional and not shown) comprises connector(s) on the processor board 52 that may be connected to other discrete devices and/or integrated circuits in addition to the processor 80.

The processor 80 may be a heterogenous processor (a combination of a Field Programmable Gate Array (FPGA) and a microprocessor) or a non-heterogenous processor. The choice of a processor to be used depends on the specific requirements for signal processing for the image or intensity data received from a particular ROIC, and communication requirements such as bandwidth, data format, etc., with the backend processing subsystem that will be used to render or analyze the image. The processor board 52 and the processor 80 may comprise a variety of different processor boards and processors, respectively. The different processor boards 52 and processors 80 may be supplied by the same or different manufacturers or vendors, and, thus, may be a plurality of different brands and/or models, that is stock keeping units (or SKU's).

The Data Acquisition (DAQ) interface firmware/software (FW/SW) 82 interfaces with the Data Acquisition and Control (DAQ-C) subsystem 16. The PCE 24 formats and processes the data from the ROIC 22 and then uses the DAQ interface 82 to send the data to the DAQ-C 16. The DAQ-C is hosted by a backend processing subsystem which is usually a PC or single board computer for displaying the image and/or signal processing for further analysis.

The ROIC hardware controller 84 controls the operation of the ROICs. Operation of the ROIC 22 may be controlled via hardware controller 84 within the PCE 24, wherein the hardware controller 84 may be configured for different types of ROICs as discussed herein. The PCE 24, such as via the heterogeneous processing element 80, communicates with the DAQ-C 16 to provide data thereto (e.g., image data) and receive instructions therefrom (e.g., type of ROIC and related ROIC configuration parameters).

The secondary clock generation and management system 86 takes the master clock from the RIS-DC 50 and produces various local clocks required by the processor board 52 and the RIS-DC 50 for hardware that is not using the Master clock.

The digitized data interface 88 takes the digitized data (intensity from the ROIC) from the ADC and formats the data so that it is readable by the ethernet and can be sent to the computer for rendering the image.

The RIS-DC 50 can be made in any suitable manner. The RIS-DC 50 can be assembled from commercially available components. The RIS-DC 50 can be combined with a commercial off the shelf (COTS) single board computational device having a processor thereon to form the pulse capture electronics (PCE) 24.

Figure 3:
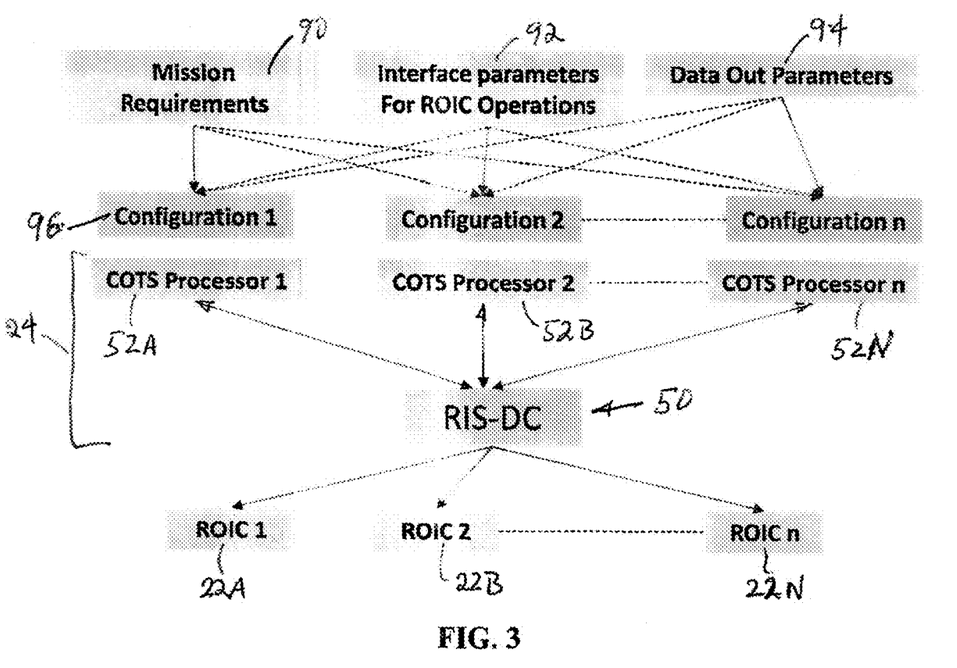
FIG. 3 is a block diagram of a RIS-DC concept of operation with varying mission requirements and optical frontends.

The RIS-DC 50 can be used in any suitable manner. FIG. 3 shows one embodiment of a RIS-DC 50 concept of operation with varying mission requirements and optical frontends. The blocks in the top row in FIG. 3 represent: Mission Requirements 90, Interface Parameters for ROIC Operations 92, and Data Out Parameters 94. Mission Requirements 90 can include but are not limited to: the image size, data output speed, and clocking frequency. Interface Parameters for ROIC Operations 92 can include but are not limited to: control data format, data collection controls, and variation of integration time. Data Out Parameters 94 can include but are not limited to: single or multiple channels, data out clocking speed, data out amplitude and offset.

The second row of blocks in FIG. 3 show that depending on the Mission Requirements 90, Interface Parameters for ROIC Operations 92, and Data Out Parameters 94, a plurality of configurations 96 of the combination of processing required and ROIC required to collect the imagery can be selected. These configurations include Configuration 1, Configuration 2, . . . , up to Configuration n, where "n" is an integer. Each configuration, or any of the configurations, will comprise a processor. The processors 52A, 52B, and 52N can be commercial off-the-shelf (COTS) processor, or they may comprise customized processors. The arrows going from the COTS processor blocks 52A, 52B, and 52N to the central RIS-DC block 50 represent providing signals to execute the functionality of the RIS-DC. The signals can be passed from the RIS-DC 50 back to the COTS processors 52A, 52B, and 52N. FIG. 3 shows that the RIS-DC 50 is configured for working with a plurality of ROICs 22A, 22B and 22N, which comprise ROIC 1, ROIC 2, . . . , up to ROIC n.

The Read-Out Integrated Circuit (ROIC) Interface System for Digitization and Control (RIS-DC) 50 described herein can provide a number of advantages. It should be understood, however, that these advantages need not be required unless they are set forth in the appended claims. The above-mentioned deficiencies and related issues are minimized or eliminated by the disclosed RIS-DC.

The system comprises a single board architecture that may comprise part of a dual board configuration. The RIS-DC 50 and a (e.g., COTS) processing board 52 together form a PCE subsystem 24. The PCE subsystem can be plugged into different optical frontends. The PCE 24 and DAQ-C 16 provide the capability to configure Read-Out Integrated Circuits (ROICs) 22 and provides reconfigurability to account for varying ROIC designs. The system is able to interface, control, and test different ROIC models and optical frontends, including those from different manufacturers, and is able to communicate the image data to a computing device for rendering and/or computational processing. The system has the ability to use standard software. The system can be portable and small enough to be suitable for airborne and spaceborne applications. This architecture provides agility with varying technologies for signal processing and varying degrees of imaging capability.

Potential commercial uses for the system include imaging systems that are used in security, surveillance, situational awareness, spectroscopy, water leak detection, archaeological prospection, scout terrain drones, and medical diagnostic imaging.

As used herein, an element or step recited in the singular and preceded with the word "a" or "an" should be understood as including the plural of such elements or steps, unless the plural of such elements or steps is specifically excluded.

The terms "joined" and "connected", as used herein, encompass configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The terms "joined" and "connected" include both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A single board comprising reconfigurable signal processing architecture, said single board comprising a Read-out Integrated Circuit (ROIC) Interface System for Digitization and Control (RIS-DC) which is configured to be combined with a processor board that contains a processor in order to form a dual board Pulse Capture Electronics (PCE) subsystem for use with an optical front end of an imaging sensor, which optical frontend includes a detector array and a Read-Out Integrated Circuit (ROIC), said single board having a processor interface and comprising:
   a) an analog input subsystem comprising multiple input channels that are configured to employ either single or multiple channels for one or more incoming analog signals from an optical frontend of an imaging sensor, wherein said analog input subsystem comprises an amplifier that is configured to amplify and format incoming analog signals;
   b) a ROIC data digitization stage comprising at least one analog to digital convertor (ADC), which ADC is a digitizing component that is in operative communication with the amplifier for digitization of signals amplified and formatted by the analog input subsystem, said ROIC data digitization stage providing digital output;

c) a power subsystem that generates multiple voltage levels for both RIS-DC usage and for ROIC operation that is configured to transmit power to several components including the amplifier, the ADC, a processor on a separate processor board, and to an optical frontend;

d) a timing control subsystem comprising a clock generation layer that can produce and distribute a master clock (MClk) that is in operative communication with one or more digital components on the RIS-DC and a processor board via a processor interface; and e) a processing system interface subsystem that is configured for interfacing with a processor board and transmitting and receiving data from a processor board for timing and control of subsystems on the RIS-DC and at least one of an optical frontend and an ROIC.

2. The RIS-DC of claim 1 wherein each channel of the analog input subsystem comprises multiple isolation and amplification stages to format a signal for digitization as either a single ended input or a differential input.

3. The RIS-DC of claim 1 wherein each channel of the ROIC data digitization stage is configured to digitize the output of the analog input subsystem with varying resolution as required by an optical frontend or system requirements.

4. The RIS-DC of claim 3, wherein the processing system interface subsystem is configured to interface the digitized output of the analog input subsystem with the processor on the processor board, which processor is in the form of a heterogenous processor or a Field Programmable Gate Array (FPGA).

5. The RIS-DC of claim 1 wherein the processing system interface subsystem is configured to interface with processors from different vendors.

6. The RIS-DC of claim 4 further comprising a hardware controller on said single board, wherein the timing control subsystem is configured to generate timing signals, the hardware controller is configured to generate hardware control signals, and a processor will generate data signals, and each of the timing, hardware control, and data signals can be regenerated with varying thresholds and buffered by the single board reconfigurable signal processing architecture for transmission to at least one of an optical frontend and a ROIC.

7. The RIS-DC of claim 2 wherein the power subsystem is configured so that power sources required for ROICs are configurable so that they can be re-sequenced for powering up and powering down ROICs for a plurality of optical frontends that contain ROICs and detector arrays with differing properties.

8. The RIS-DC of claim 2 wherein the timing control subsystem comprises multiple timing sources that can be configured to generate varying clock frequencies for a system clock or a master clock (MClk) for different mission requirements.

9. The RIS-DC of claim 8 wherein the clock generation layer is configured to provide at least one timing signal that can be distributed externally to a processor board to provide timing and data synchronization to generate multiple sub-harmonic signals that are phase aligned with the MClk.

10. The RIS-DC of claim 9 wherein some components on the RIS-DC require different clock frequencies, and the clock generation layer is configured to generate derived local clocks from the MClk for the components on the RIS-DC that require different clock frequencies, while maintaining the clock phase aligned with the MClk.

11. A dual board Pulse Capture Electronics (PCE) subsystem for use with an optical front end of an imaging sensor, said PCE subsystem comprising:

the single board comprising reconfigurable signal processing architecture comprising a Read-out Integrated Circuit (ROIC) Interface System for Digitization and Control (RIS-DC) of claim 1; and a processor board comprising a processor, output signal drivers, and a processor board interface, wherein said processor board is operatively connected to said single board at said processor board interface.

12. A single board comprising reconfigurable signal processing architecture, said single board comprising a Read-out Integrated Circuit (ROIC) Interface System for Digitization and Control (RIS-DC) which is configured to be combined with a processor board that contains a processor in order to form a dual board Pulse Capture Electronics (PCE) subsystem for use with an optical front end of an imaging sensor, which optical frontend includes a detector array and a Read-Out Integrated Circuit (ROIC), said single board having a processor interface and comprising:

a) a transceiver stage comprising multiple input channels that are configured to employ either single or multiple channels for bidirectional signals from an optical frontend of an imaging sensor and a processor;

b) a power subsystem that generates multiple voltage levels for both RIS-DC usage and for ROIC operation that is connected to transmit power to several components including a processor on a separate processor board, and multiple ROIC and detector arrays of an optical frontend;

c) a timing control subsystem comprising a clock generation layer that can produce and distribute a master clock (MClk) that is in operative communication with one or more digital components on the RIS-DC and the processor board via a processor interface; and d) a processing system interface subsystem that is configured for interfacing with a processor board and transmitting and receiving data from a processor board for timing and control of subsystems on a RIS-DC and at least one of an optical frontend and an ROIC.

13. A dual board Pulse Capture Electronics (PCE) subsystem for use with an optical front end of an imaging sensor, said PCE subsystem comprising:

the single board comprising reconfigurable signal processing architecture comprising a Read-out Integrated Circuit (ROIC) Interface System for Digitization and Control (RIS-DC) of claim 12; and a processor board comprising a processor, output signal drivers, and a processor board interface, wherein said processor board is operatively connected to said single board at said processor board interface.

* * * * *